(12) United States Patent
Lee

(10) Patent No.: US 7,504,745 B2
(45) Date of Patent: Mar. 17, 2009

(54) MULTIFUNCTIONAL MULTI-OUTLET OF SAVING ELECTRIC POWER AND A CONTROL METHOD EMPLOYING THE SAME

(75) Inventor: Keun-Jin Lee, Seoul (KR)

(73) Assignee: Wellbas Limited (KR)

( * ) Notice: Subject to any disclaimer, the term of this patent is extended or adjusted under 35 U.S.C. 154(b) by 71 days.

(21) Appl. No.: 10/597,856

(22) PCT Filed: May 4, 2004

(86) PCT No.: PCT/KR2004/001040

§ 371 (c)(1),
(2), (4) Date: Aug. 10, 2006

(87) PCT Pub. No.: WO2005/076416

PCT Pub. Date: Aug. 18, 2005

(65) Prior Publication Data

US 2007/0262646 A1    Nov. 15, 2007

(30) Foreign Application Priority Data

Feb. 10, 2004 (KR) .................. 10-2004-0008723

(51) Int. Cl.
H02J 3/00 (2006.01)
(52) U.S. Cl. ........................................... 307/39
(58) Field of Classification Search ............... 307/39
See application file for complete search history.

(56) References Cited

U.S. PATENT DOCUMENTS

| | | | | |
|---|---|---|---|---|
| 5,424,903 A | * | 6/1995 | Schreiber | ............... 361/166 |
| 5,483,464 A | * | 1/1996 | Song | ............... 713/300 |
| 5,506,790 A | * | 4/1996 | Nguyen | ............... 700/286 |
| 5,699,051 A | | 12/1997 | Billig et al. | |
| 5,721,934 A | * | 2/1998 | Scheurich | ............... 713/320 |
| 5,747,972 A | | 5/1998 | Baretich et al. | |
| 6,573,619 B2 | * | 6/2003 | Chin | ............... 307/125 |
| 6,631,309 B2 | | 10/2003 | Boies et al. | |
| 6,670,597 B1 | * | 12/2003 | Kitamura et al. | ...... 250/214 AL |
| 6,731,024 B1 | * | 5/2004 | Molnar et al. | ............... 307/147 |
| 6,940,272 B2 | * | 9/2005 | Niv | ............... 324/158.1 |
| 7,043,543 B2 | * | 5/2006 | Ewing et al. | ............... 709/223 |
| 7,151,234 B2 | * | 12/2006 | Wolpert et al. | ............ 200/51.09 |
| 7,193,335 B2 | * | 3/2007 | Palmer et al. | ............... 307/39 |

* cited by examiner

Primary Examiner—Stephen W Jackson
Assistant Examiner—Hal I Kaplan
(74) Attorney, Agent, or Firm—McKee, Voorhees & Sease, P.L.C.

(57) ABSTRACT

Disclosed is a multifunctional multi-tap (concent) of intercepting a stand-by electric power and a control method employing the same which prevent big fire generated by leakage current by performing an interlocking control and a single-acting control (separate control) in accordance with subordination of respective appliances using a illumination sensor or a body-detecting sensor. The multifunctional multi-tap (concent) detects a signal according, to an illuminance and a motion of body around respective lead-in holes activated as an interlocking control and a single-acting control using an illumination sensor or a body-detecting sensor, discriminates the detected signal by a controller, and controls the respective appliances as a stand-by state or a power-saving state in accordance with the interlocking control or the single-acting control.

16 Claims, 10 Drawing Sheets

MULTIFUNCTIONAL MULTI-OUTLET OF SAVING ELECTRIC POWER AND A CONTROL METHOD EMPLOYING THE SAME

FIELD OF THE INVENTION

The present invention relates to a multi-tap, particularly to a multifunctional outlet strip for intercepting a stand-by electric power and a control method employing the same, wherein an interlocking control and a single-acting control (separate control) are performed in accordance with the subordination of electrical appliances by using an illumination sensor or a body-detecting sensor, the introduction of over current or surge current is avoided, and the current capacity which is different according to the electric appliances is detected to adjust the capacity of the outlet strip to comply with the capacity of the appliance.

BACKGROUND OF THE INVENTION

Generally, electric appliances which are used in a house, an office, or a factory are classified into two groups, i.e., those which need to be supplied with power all the time such as a refrigerator and those which need to be supplied with power on occasion such as a television, an audio, and a computer monitor.

However, even in the latter type of appliances, most of them are connected to a power source all the time since the power source is usually connected to a outlet located on a wall or a floor so the blocking of the power is inconvenient.

FIG. 1 shows the construction of a power supply system for an electric appliance 200. As shown, an electric energy is supplied to an appliance by connecting a plug of the appliance to an alternating current power or a general outlet 100. In most cases, the appliance is continuously connected with the power due to the inconvenience of blocking the power.

Accordingly, due to such continuous connection, electric power has been consumed unnecessarily and there exists a possibility of a big fire. The total sum of the wasted electric power nationwide is considerable.

In order to overcome such problem caused due to the current leakage of an appliance, a multi-type standby current intercepting multi-tap has been rolled out. This type of outlet strip detects whether or not a user operates a computer by using the clock signal and the data signal of a mouse and a keyboard, which are the input devices of a computer. If it is determined that the computer is not being used, the power is not to be supplied to the peripherals.

If a user reuses the computer, the power is supplied to the peripherals again. By doing such, the power can be saved when a user is not using the computer but the computer is on.

To avoid the current leakage, a outlet including a control module for interlocking the mainframe and the peripherals of a computer is also used. Herein, according to the interlocking control, the main frame of a computer is connected to the main outlet and the peripherals (for example, a printer and a monitor) are connected to the auxiliary outlets. Thus, if the mainframe of the computer is turned off, the multi-tap detects and intercepts the standby power supplied to the peripherals so that the power can be saved.

On the contrary, according to the single-acting control, appliances are individually connected to the auxiliary outlets regardless of the main outlet, and multi-tap detects and supplies/intercepts the standby electric power. Hereinafter, the interlocking control and the single-acting control will be described.

Even remote-control power-saving outlet devices are widely used for the aforementioned type of multi-tap.

However, in the case of the outlet employing the interlocking control function, it has deficiency in precisely detecting the peripherals and sensitively controlling the on/off operation.

Also, the above conventional multi-tap has the problem in that it does not work (i.e., the interlocking control) if the current capacity is used for different appliances at the same time.

SUMMARY OF THE INVENTION

The present invention is provided to overcome the foregoing stated problem which the prior art contains. It is the primary object of the present invention to provide a multifunctional outlet strip for intercepting a stand-by electric power and a control method employing the same, wherein an illumination sensor or a body-detecting sensor automatically detects the time period when electric power does not need to be supplied to an appliance such as a television or a monitor, which does not need the constant supply of electric power, and the power of the appliance is turned on/off according to the detected signal, so that unnecessary leakage of electric power can be avoided and a fire caused from the leakage current can be prevented.

It is another object of the present invention to provide a multifunctional outlet strip for intercepting a stand-by electric power and a control method employing the same.

It is another object of the present invention to provide a multifunctional outlet strip for intercepting a stand-by electric power and a control method employing the same, wherein the current capacity is adjusted according to the appliances, which have their own current capacities, so that the outlet is compatible with different appliances.

It is another object of the present invention to provide a multifunctional outlet strip for intercepting a standby electric power and a control method employing the same, wherein according to the on/off state of a main appliance such as the mainframe of a computer, the powers of the peripheral appliances interlocked with the main appliance are switched on/off, and further, apart from the interlocking control, the user can operate the appliances individually by his/her selection.

In order to achieve the above objects of the present invention, a multifunctional outlet strip for intercepting a stand-by electric power comprises: an over-current circuit breaker for detecting and intercepting an over-current or a surge current generated due to a malfunction of an appliance; a power section for generating and outputting a motion voltage which is supplied to the parts inside of the outlet strip through a rectification, smoothing and voltage regulation process; a motion condition setting part in which a user switches and sets whether or not a sensor is used and whether an interlocking control or a single acting control is adopted, and which outputs the switching signal; a sensor part for detecting a light or a body motion and outputting a signal accordingly; a current detecting part for detecting a current flowing into an interacting or a single-acting appliance and outputting the detected signal; a control part which receives the user's switching signal for the selection of the interlocking/single-acting function and the detected signal, determines the detected signal of the sensor, and outputs an on/off control signal for switching the appliances, which are plugged into each outlet, in a standby state or a power-saving state according to the interlocking or single-acting function; and an output control part which receives the on/off control signal of the control part and supplies/intercepts the power current flowing into each lead-in holes.

Also, a control method for a multifunctional outlet strip for intercepting a stand-by electric power comprises the steps of: a) determining whether there is a change in light using a sensor; b) setting a main outlet into a standby state, if there is a change in light detected by the sensor; c) determining which auxiliary lead-in hole is interlocked or single-acted; d) determining whether or not the main outlet is currently used, if a predetermined number of auxiliary outlets are determined to be interlocked in step (c); e) turning on all of the predetermined number of the interlocked auxiliary outlets if the main outlet is currently used; f) turning off all of the predetermined number of the interlocked auxiliary outlets if the main outlet is not currently used as a result of step (d); and g) turning off all of the predetermined number of the single-acted auxiliary outlets, in case that a predetermined number of auxiliary outlets are determined to be single-acted in step (c).

DETAILED DESCRIPTION OF THE PREFERRED EMBODIMENT

Hereunder, with reference to the attached drawings, a preferred embodiment is illustrated for the multifunctional outlet strip for intercepting a stand-by electric power and a control method employing the same according to the present invention, in which an illumination sensor or a body-detecting sensor detects whether there is a change in light or whether there is a person around each of the lead-in holes under the interlocking or single-acting control; the detected signal supplies or intercepts the commercial alternating current applied to each lead-in hole according to the interlocking or single-acting control condition; the current value of respective appliances is selectively adjusted so that the outlet strip can be compatible with the appliances with different current capacity.

Figure 1:
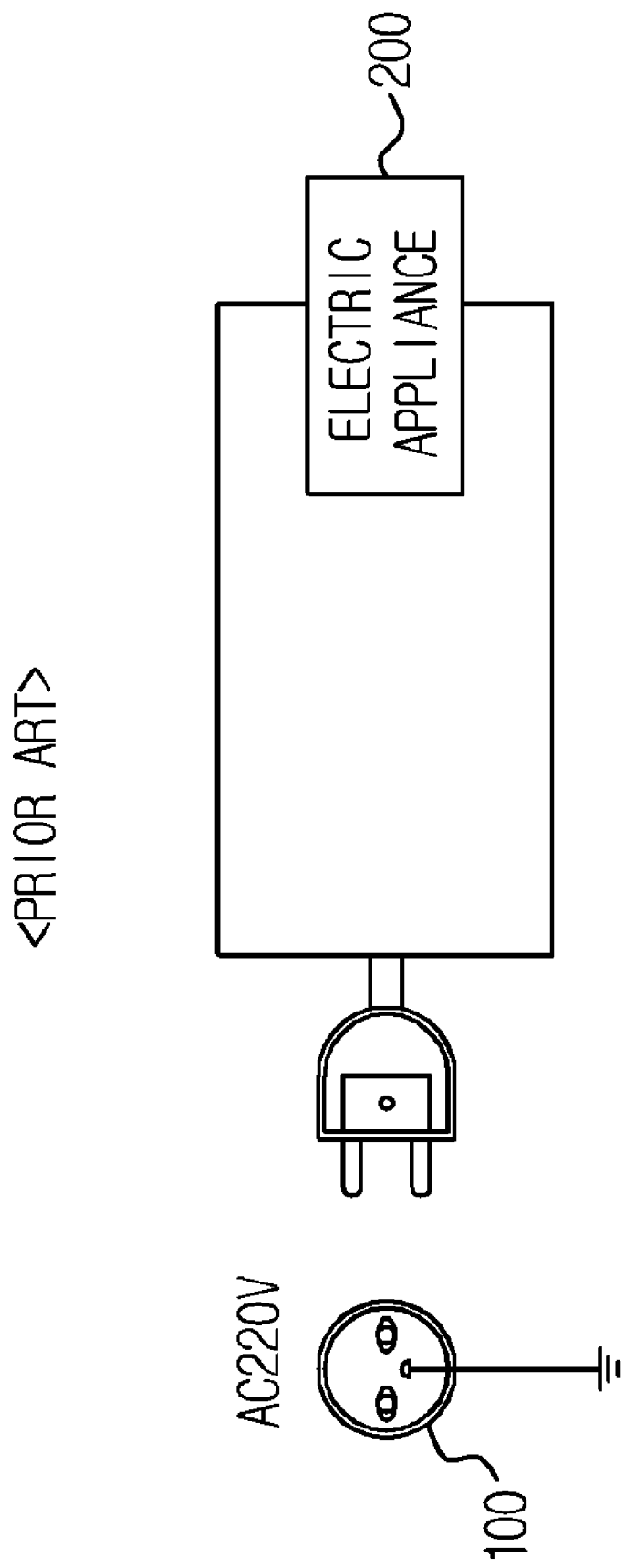
FIG. 1 is an exemplary view showing a system for supplying electric power to an appliance according to the prior art.
Figure 2:
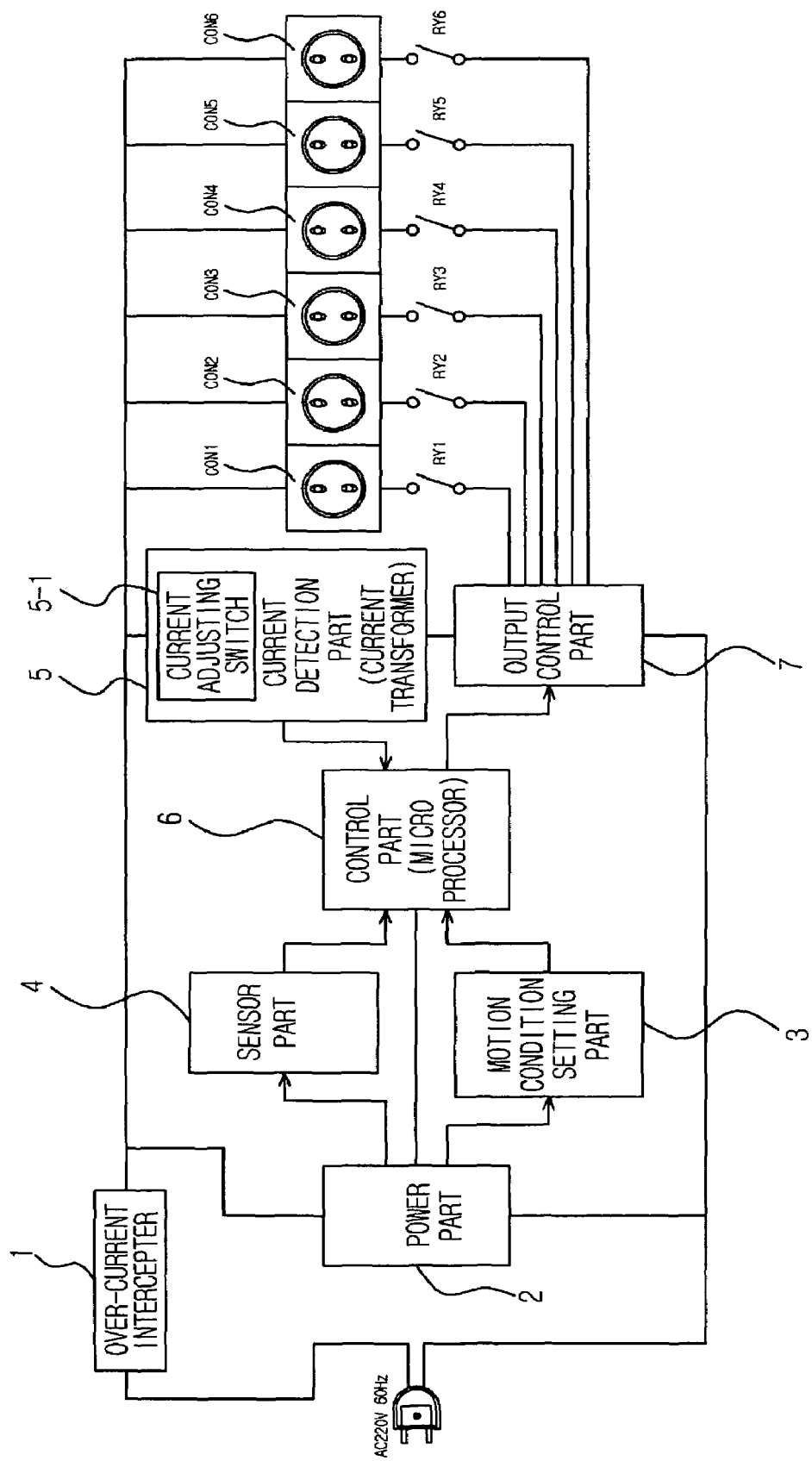
FIG. 2 is a block diagram showing the construction of a multifunctional outlet strip for intercepting a stand-by electric power according to the present invention.

FIG. 2 is a block diagram showing the construction of a multifunctional outlet strip for intercepting a stand-by electric power according to the present invention.

As shown, the multifunctional outlet strip for intercepting a stand-by electric power according to the present invention comprises: an over-current interceptor 1 for intercepting or supplying a commercial alternating current by detecting the over-current or surge current flowing into an appliance due to a malfunction of the appliance; a power part 2 for generating and outputting a motion voltage, which is to be provided from a commercial alternating current power to each part of the outlet strip through the rectification, smoothing and voltage regulation process, and a clock signal for driving a timer built in a control part 6, which will be described below; a motion condition setting part 3 for setting the condition according to a user's switching operation regarding whether or not a sensor is used and whether appliances are interlocked or single-acted, and outputting a switching signal accordingly; a sensor part 4 for detecting an illuminance or body motion and outputting a signal accordingly; a current detecting part 5 for detecting a current flowing into an interlocked or single-acted appliance and outputting a signal accordingly; a control part 6 which receives the switching signal and the detection signal, and outputs an on/off control signal for controlling an appliance, which is lead in each lead-in hole according to the interlocking or single-acting condition, with the standby or power-saving state; and an output control part 7 for supplying or intercepting current flowing into each appliance according to the on/off control signal of the control part 6.

Generally, the commercial alternating current power used in Korea is the one for 220V and 60 hZ.

Thus, the multi-tap (concent) of the present invention is set for 220V and 60 hZ. However, if it is used in other country with different commercial alternating current, it is, of course, possible to adapt to the different power.

The multifunctional outlet strip for intercepting a stand-by electric power according to the present invention operates as follows.

First, the over-current interceptor 1 intercepts or supplies a commercial alternating current power by detecting the over-current or surge current flowing into an appliance due to a disorder of an appliance.

The power part 2 generates a motion voltage, which is to be provided from a commercial alternating current power to each part of the outlet strip through the rectification, smoothing and voltage regulation process. Herein, the motion voltage generated by the power part 2 is mainly the direct current voltage of 5V to 12V, and the 12V is used for the power of each relay RY1-RY6 built in the output control part 7 and 5V is used for the powers of the parts other than the above relays.

Also, the power part 2 generates a clock signal for driving a timer (not shown) built in the control part 6. If the change of illuminance or the motion of a human body is not detected by the sensor part 4, the timer is operated for a predetermined time period to automatically intercept the power applied to an interlocked or single-acted appliance. The timer and its function will be detailedly explained later.

The motion condition setting part 3 sets the condition according to a user's switching operation regarding whether or not a sensor is used and whether appliances are interlocked or single-acted, and outputs the switching signal to the control part 6. Herein, the interlocking condition can be set so that while a main appliance such as a mainframe of a computer is being connected to the main outlet CON1, the appliances interlocked with the main appliance such as the peripherals of a computer can be supplied with or blocked from the power.

If the user desires to use a television or an audio individually apart from the appliances which are set by the above interlocking condition and connected to the auxiliary outlets, the user can set a single-acting condition by a simple switching operation for the television or the audio.

Also, the motion condition setting part 3 can select by a user's simple switching operation regarding whether only the illumination sensor is to be used or the illumination sensor and the body-detecting sensor are to be used at the same time.

Thereafter, the switching signal according to the interlocking or single-acting condition and the switching signal according to the selection of the sensor are transferred to the control part 6.

The sensor part 4, as above described, comprises the illuminance sensor or the body-detecting sensor which can be alternatively selected by the user at the motion condition setting part 3, and detects an illuminance or body motion to output the signal to the control part 6.

The current detecting part 5 detects a current flowing into an interlocked or single-acted appliance to output the detection signal to the control part 6.

Thereafter, the control part 6 receives the switching signal and the detection signal and outputs an on/off control signal to control the power applied to each appliance which is interlocked or single-acted. In other words, the control part 6 receives the switching signal from the user's switching to select the interlocking or single-acting condition, and receives the detection signal from each of the interlocked or single-acted appliances. And the control part 6 determines the detection signal transferred from the sensor part 4 and outputs an on-off control signal to the output control part 7 according to the interlocking or single-acting condition. Herein, the control part 6 is: implemented with a microprocessor.

Figure 9:
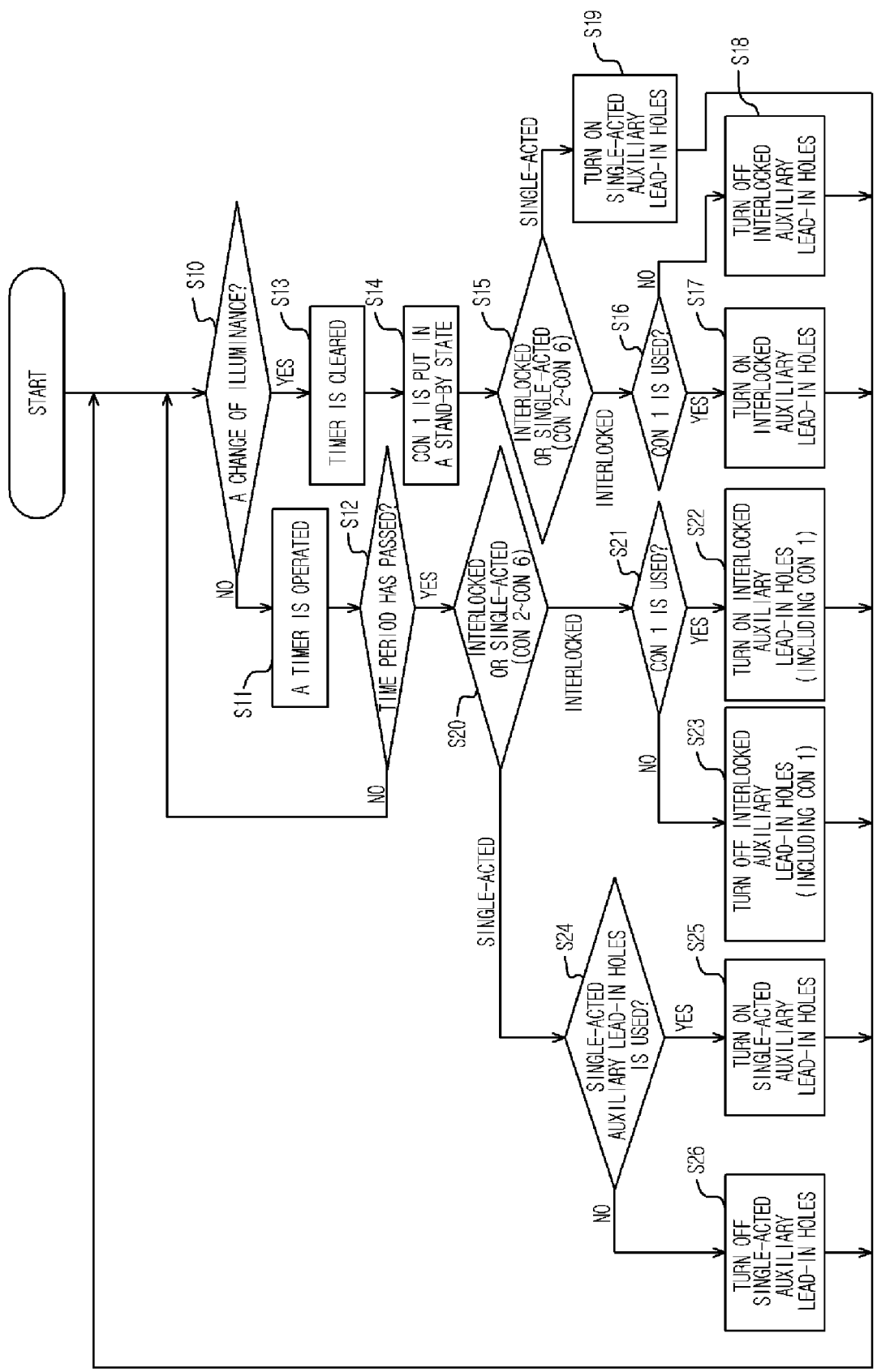
FIG. 9 is a motion flow chart showing a control method of the multifunctional outlet strip for intercepting a stand-by electric power according to the present invention, if an illumination sensor is used.
Figure 10:
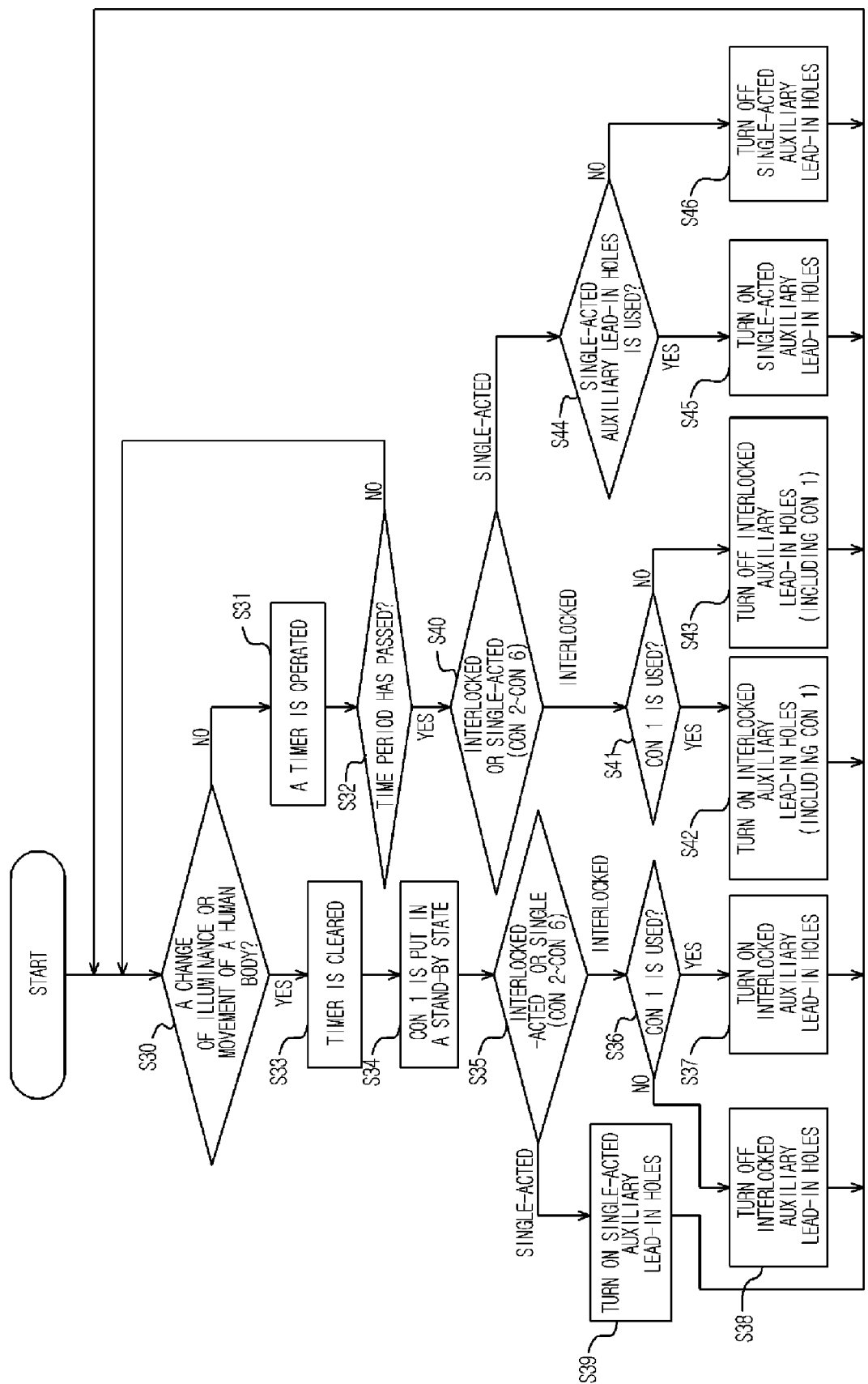
FIG. 10 is a motion flow chart showing a control method of the multifunctional outlet strip for intercepting a stand-by electric power according to the present invention, if an illumination sensor and a body-detecting sensor are used at the same time.

The control method of the outlet strip according to the present invention will be detailedly explained in the description regarding FIGS. 9 and 10.

The output control part 7 supplies or intercepts the current flowing into each appliance according to the on/off control signal of the control part 6. Herein, the output control part 7 can be implemented with a relay device and supplies or intercepts the power to each appliance according to its own on-off state.

FIGS. 3-8 are detail circuit diagrams showing each part of the multifunctional outlet strip for intercepting a stand-by electric power of FIG. 2.

Figure 3:
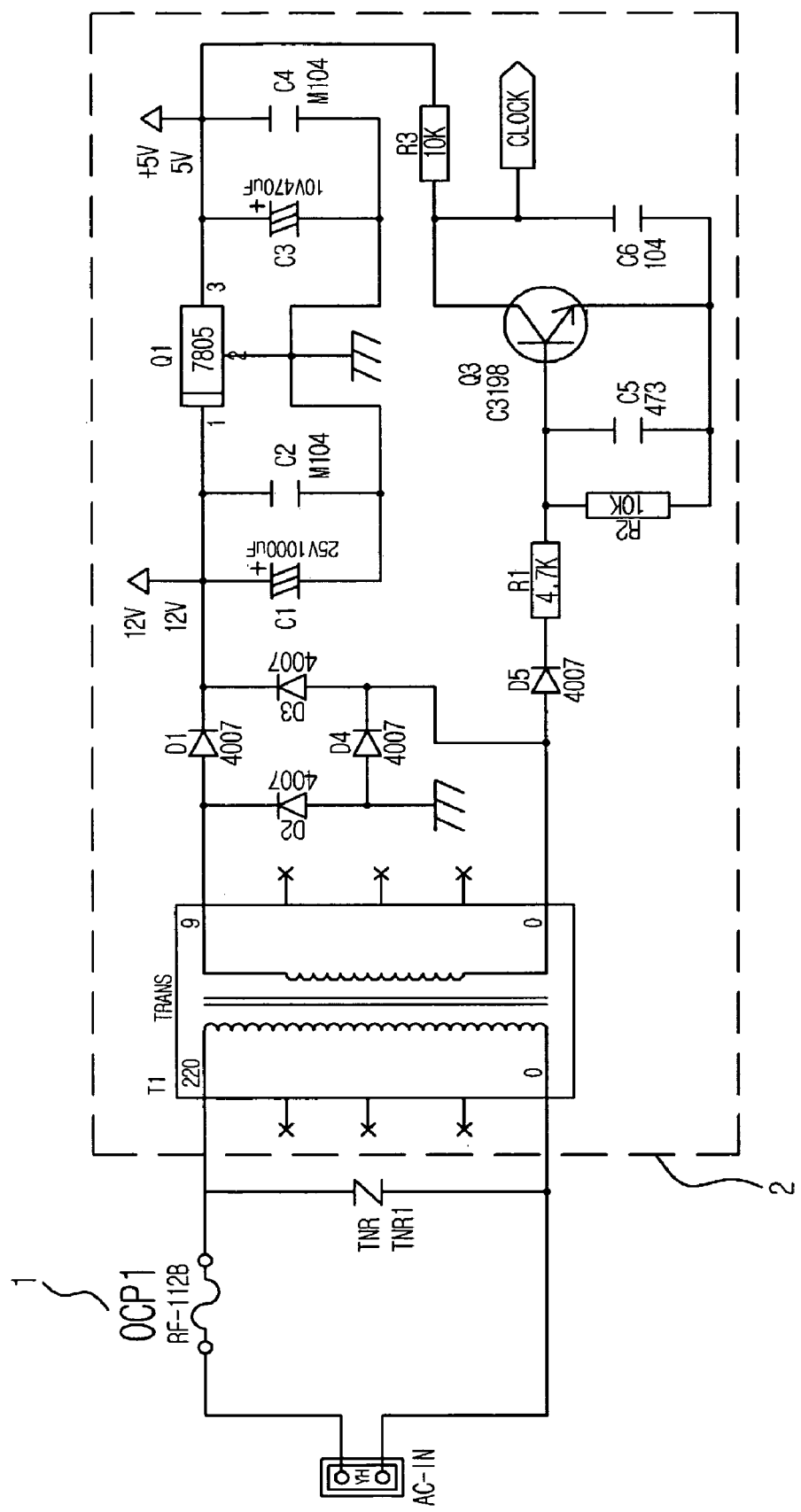
FIGS. 3-8 are detail circuit diagrams showing each part of the multifunctional outlet strip of saving electric power of FIG. 2.

FIG. 3 is a detail circuit diagram showing the over-current interceptor and the power part according to FIG. 2.

As shown, the over-current interceptor 1 intercepts a commercial alternating current power by detecting the over-current or surge current flowing into an appliance due to a disorder of an appliance. Once the reason for the over-current is eliminated, the power is supplied again by the user's operation of a reset button. Herein, the range of the interceptable over-current varies depending upon the over-current intercepting devices and can be predetermined and set at the initial manufacturing stage.

The power part 2 converts the commercial alternating current power into a direct current power and supplies the same to each part of the outlet strip.

Specifically, the commercial alternating current power is stepped down into a predetermined alternating current voltage through a step-down transformer. Next, the alternating current voltage is full-wave rectified through a bridge circuit formed with 4 diodes D1-D4. The full-wave rectified alternating current voltage is smoothed through a capacitor to be a direct current voltage of 12V. The 12V direct current voltage is used as an operating voltage for driving the relay devices of the output control part 7.

Also, the direct current voltage of 12V is stepped down into the one of 5V through a constant voltage circuit and used for operating the microprocessor of the control part 6, the motion condition setting part 3, and the illuminance sensor and the body-detecting sensor of the sensor part 4.

Meanwhile, the power part 2 generates a clock signal for driving the timer (not shown) built in the control part 6. In other words, the alternating current voltage which was stepped down through the step-down transformer, generates an on-off signal through a transistor Q3, and the on/off signal is used as a clock signal for driving the timer built in the microprocessor of the control part 6.

Figure 4:
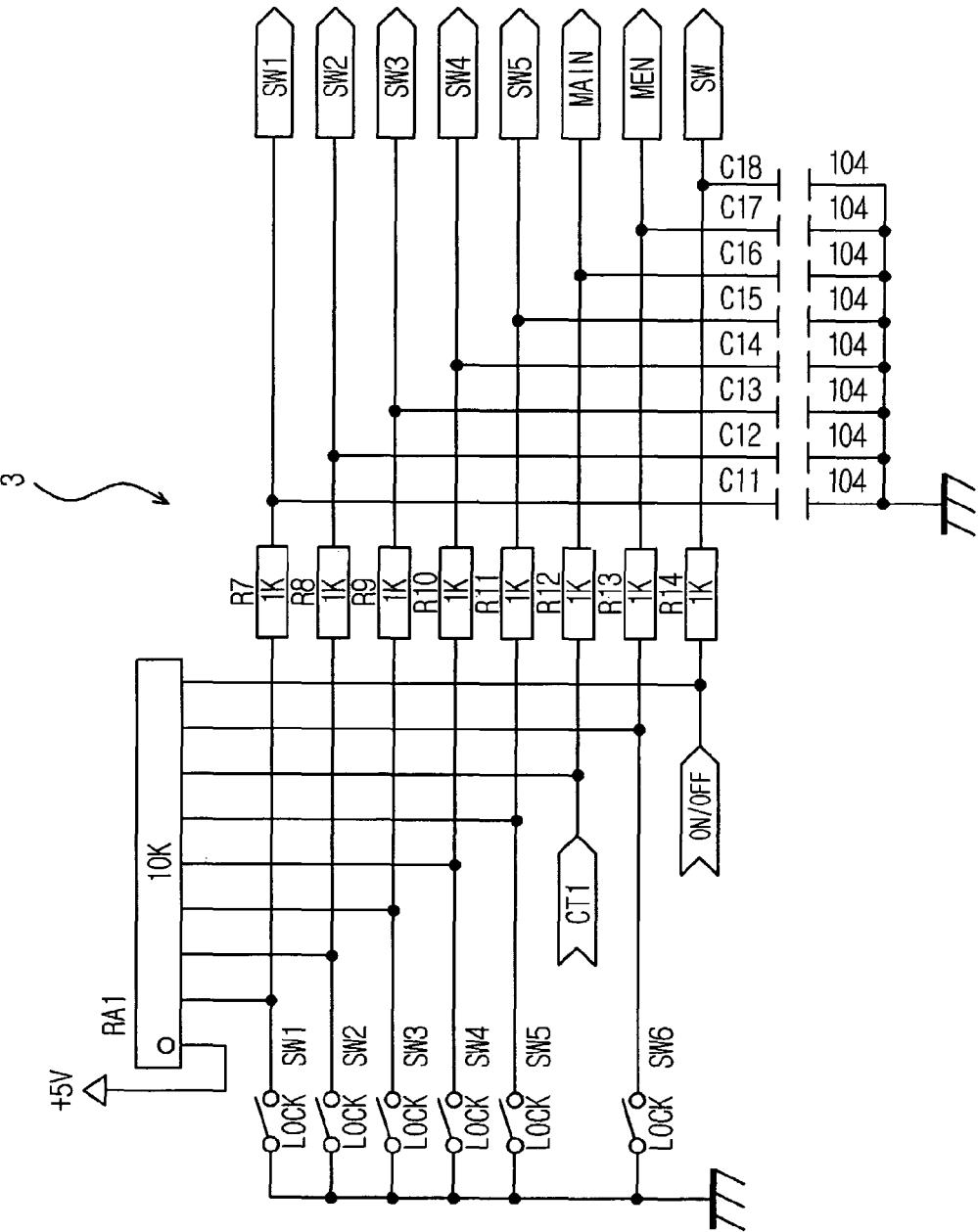

FIG. 4 is a detail circuit diagram showing the motion condition setting part according to FIG. 2.

As shown, the motion condition setting part 3 consists of an array resister RA1 and switches SW1-SW6. The switches SW1-SW6 are disposed outside of an outlet so that a user can choose whether the appliance corresponding to each of the auxiliary outlets CON2-CON6 is used in the interlocking condition or the single-acting condition.

Herein, if the main outlet CON1 is connected by an appliance, the on signal transferred from a terminal CT1 is inputted to the control part 6 so that the control part 6 perceives that the main outlet CON1 is being used.

On the contrary, if the main outlet CON1 is not connected by any appliance, the off signal outputted from the terminal CT1 is transferred to the control part 6 so that the control part 6 perceives that the main outlet CON1 is not being used. Thus, in this case, the outlet strip works under only single-acting control, not interlocking control.

If the main outlet CON1 is connected by an appliance, i.e., if an on signal is inputted to the terminal CT1, the user can select the interlocking or single-acting alternatively regarding each appliance corresponding to the auxiliary lead-in hole. CON2-CON6 by turning on/off the switches SW1-SW5. Of course, the on/off signals of the switches SW1-SW5 are transferred to the microprocessor of the control part 6 so that the control part 6 can perceive which auxiliary outlets are interlocking controlled or single-acting controlled.

The switch SW6 is disposed outside of the outlet strip so that the user can select whether the switch should use an illumination sensor or use an illumination sensor and a body-detecting sensor at the same time. In this event, of course, the on/off signals corresponding to the above two options are transferred to the microprocessor of the control part 6 so that the control part 6 can determine whether to receive a signal from only the illumination sensor or both the illumination and body-detecting sensors.

Herein, after the control part 6 perceives the sensor to transfer the signal according to the on-off signal of the switch SW6, if no change of illumination or no movement of a human body is detected from the sensors, the timer built in the control part 6 is operated to switch each outlet to the standby state or the power saving state. The operation time of the timer can be variably set at the initial manufacturing stage.

The terminal ON/OFF is used when the body-detecting sensor of sensor part 4 is selected as an option. If the on signal is inputted from the terminal, it means that the body-detecting sensor would be used. If the off signal is inputted from the terminal, it means that the body-detecting sensor would not be used. Of course, if the body-detecting sensor is not used, the user selects the illumination sensor or the timer by means of the switch SW6.

Figure 5:
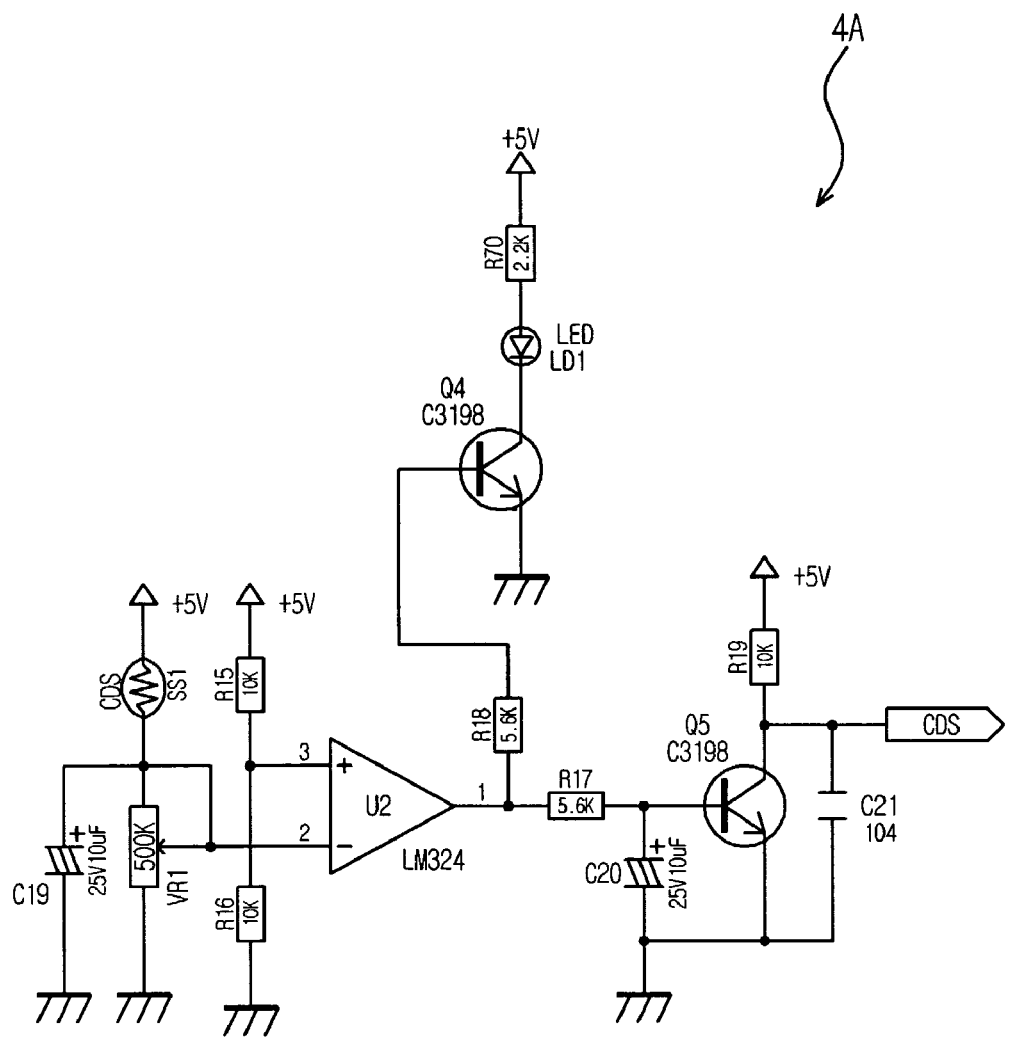
Figure 6:
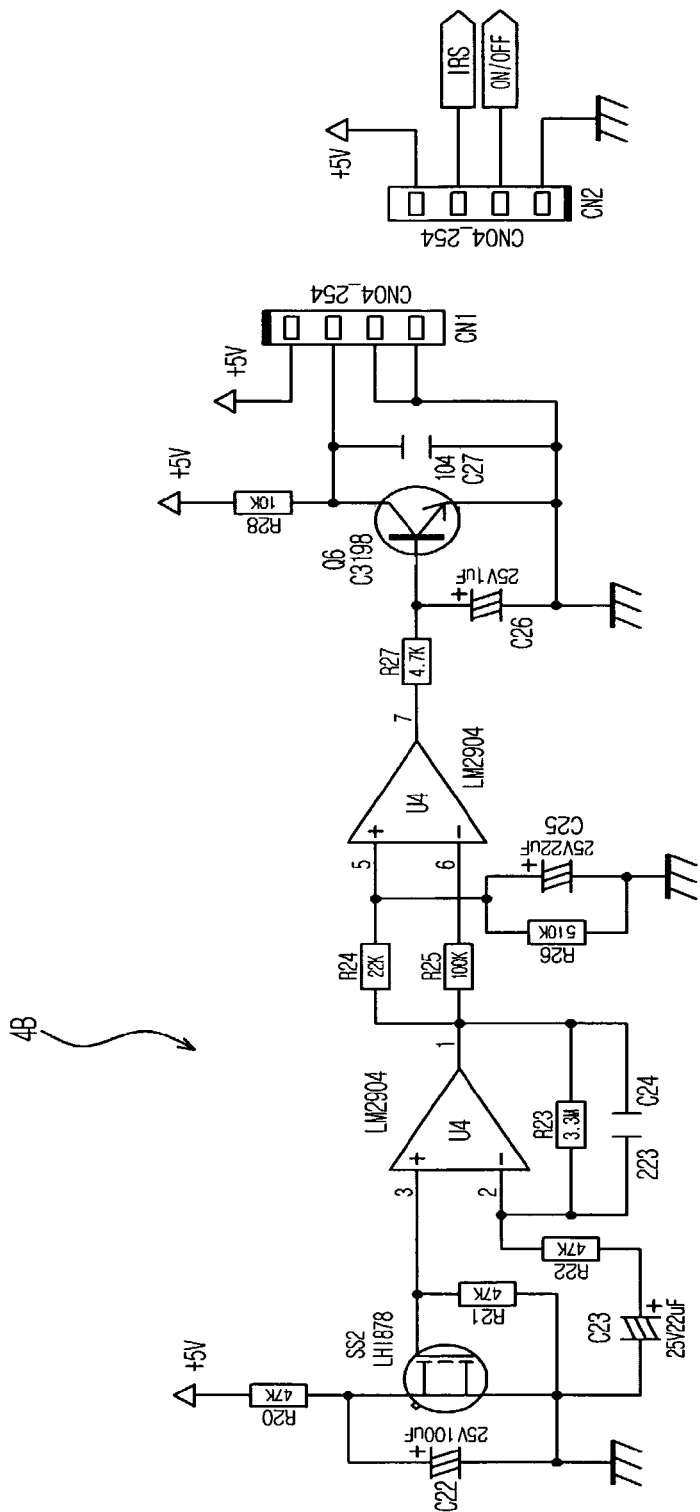

FIGS. 5 and 6 are detail circuit diagrams showing the illumination sensor and the body-detecting sensor which are included in the sensor part 4 of FIG. 2.

The operation of the illumination sensor 4A shown in FIG. 5 will be illustrated first.

If the illumination CDS sensor detects light, i.e., a resistance corresponding to the light is detected, a comparator U2 detects the change of illuminance by comparing the detected resistance with a reference resistance. At this time, an illumination detecting adjuster VR1 can set the reference resistance representing the illuminance of light.

Thereafter, the comparator U2 computes the difference between the resistance of the illumination CDS sensor and the reference resistance, and a signal according to the computation is inputted to a transistor Q5. The signal inputted to the transistor Q5 is converted into an on/off control signal and transferred to the control part 6 through a terminal CDS. Thus, the control part 6 determines a change of illuminance by the signal detected by the illumination sensor. According to the change of illuminance, electric power is supplied or intercepted to each interlocked or single-acted appliance so that the outlet can be switched into a standby state or a power saving state.

The difference computed from the comparator U2 is amplified through the transistor. According to the signal corresponding to the difference, a display LD1 glows or flashes. Herein, the flashing of the display LD1 represents the change of illuminance, i.e., the outlet strip is illuminated to a power saving or standby state.

Next, the operation of the body-detecting sensor 4B of FIG. 6 will be explained.

The body-detecting sensor SS2 detects a change from the blocking of light by a body movement. The detected signal is transferred to a two-stage amplifier. The amplified detected signal is transferred to a transistor Q6 to be converted to an on/off control signal, which is determined by the control part 6. Herein, an infrared sensor is mainly used as the body-detecting sensor.

The terminal ON/OFF is used if the body-detecting sensor is selected as an option. If two connectors CN1, CN2 are connected with each other, an on signal is outputted. If they are disconnected, an off signal is outputted.

However, as described above, the present invention is confined to only the case where the on signal is inputted from the terminal ON/OFF. That is, the present invention will be described on the assumption that the two connectors CN1, CN2 are interconnected.

Thereafter, the control part 6 detects the motion of a human body through the signal detected by the body-detecting sensor. According to the movement change, electric power is supplied or intercepted to each interlocked or single-acted appliance so that the outlet strip is controlled as the standby or power saving state.

Although it is not shown in the figures, the body-detecting sensor can include a display to visualize the change of movement like the illumination sensor 4A.

Figure 7:
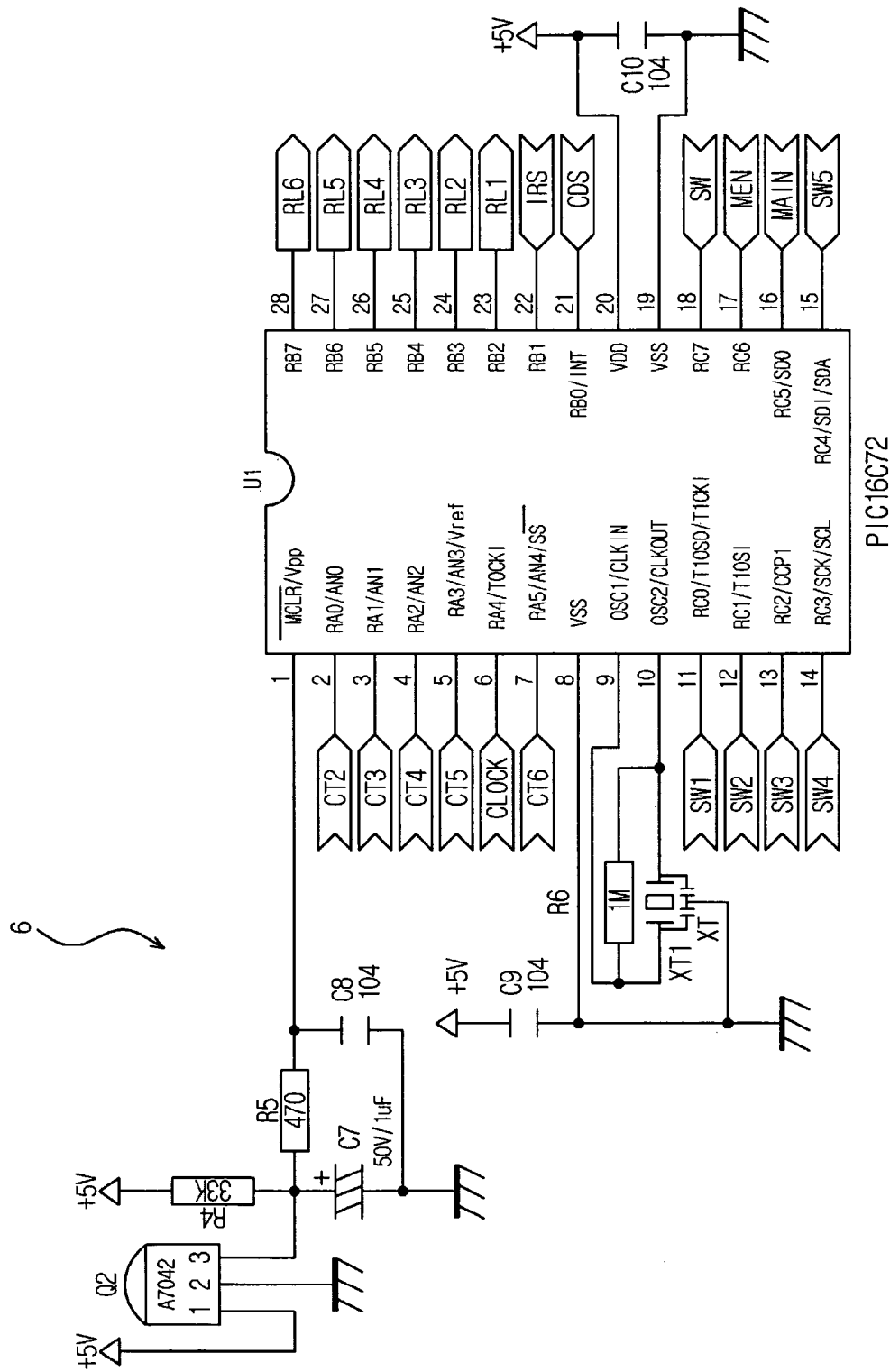

FIG. 7 is a detail circuit diagram showing the control part of FIG. 2.

The control part 6 receives the on/off signals the from the switches SW1-SW5 of the motion condition setting part 3 through the respective terminals and perceives which auxiliary outlet(s) is/are is interlocked or single-acted.

Also, the control part 6 receives the on/off signal from the switch SW6 through the terminal MEN and determines whether to receive the detection signal only from the illumination sensor or from both the illumination and the body-detecting sensors.

Also, the control part 6 receives the on signal of the terminal CT1 when the main outlet CON1 is connected by an appliance, so that it perceives that the main outlet CON1 is being used.

On the contrary, the control part 6 receives the off signal of the terminal CT1 when the main outlet CON1 is not connected to any appliance, so that it perceives that the main outlet CON1 is not being used. Accordingly, in this case, the outlet strip operates under single-acting control only, which is perceived by the control part 6. The on/off signal of the terminal CT1 is transferred from a first current detecting circuit 5A which will be explained later regarding the detail circuit diagram of the current detecting part of FIG. 8.

As explained above, the control part 6 is initially set by receiving the on/off signal from the sensor through the terminal MEN, and by receiving the on/off signal corresponding to the option of interlocking or single-acting function through the switches SW1-SW5.

After the initial setting, the control part 6 performs the control to induce each appliance to a standby or power saving state, by the following process: detecting the change of illuminance and the movement of a human body by the on/off signal inputted to the terminals CDS, IRS; detecting the variation of the current flowing into each appliance, which is interlocked or single-acted and connected to auxiliary lead-in hole CON2-CON6, by the current detecting part 5; receiving detection signal through the terminals CT2-CT6; and outputting the on/off control signal to the output control part 7.

If neither of the two sensors perceives the change of illuminance nor the body motion, the control part 6 activates the built-in timer to control the appliance in the standby or power saving state.

The operation of the control part 6 is performed by comprehensively determining the on/off signals transferred from each of the terminals SW1-SW5, MAIN, MEN, CT2-CT6, CLOCK, CDS, IRS, and by finally inputting the on/off control signal to the output control part 7. At this time, the relay built in the output control part 7 are connected or disconnected according to the on/off control signals so that the power current flowing into the appliance connected to each lead-in hole CON1-CON6 can be supplied or intercepted. This will be more explained in the detail circuit diagram of the output control part of FIG. 8.

Figure 8:
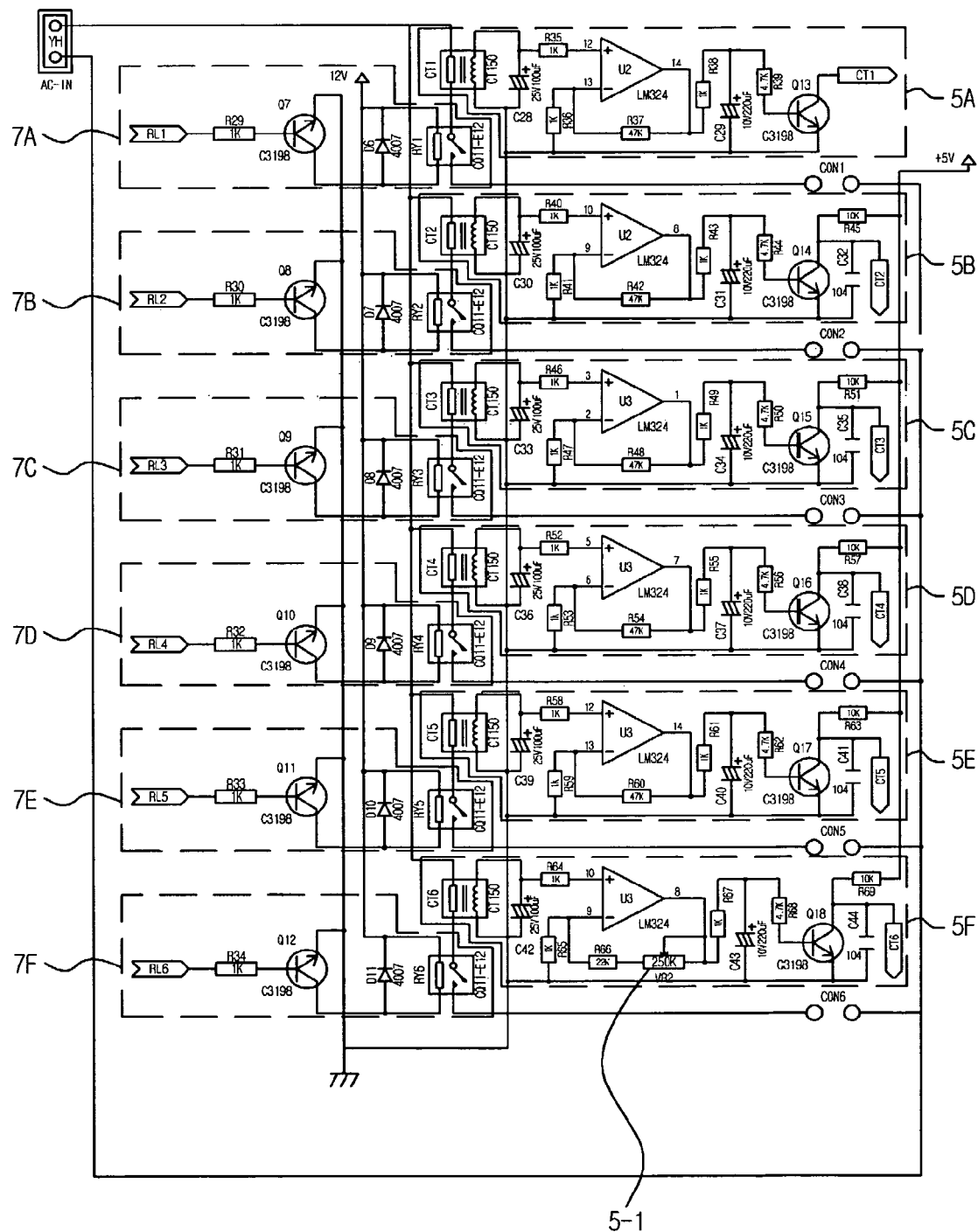

FIG. 8 is a detail circuit diagram showing the current detecting part and the output control part of FIG. 2.

First, the current detecting part 5 is explained.

The current detecting part 5 is composed of a first to sixth current detecting circuits 5A-5F.

The main outlet CON1 is connected to an appliance for interlocking control such as the mainframe of a computer. Herein, the first current detecting circuit 5A detects the current flowing to the appliance and outputs the on/off signal according to the use of the appliance for interlocking to the terminal MAIN of the control part 6 through the circuit CT1. Such operation is conducted at the initial setting stage of the control part 6.

Meanwhile, the auxiliary outlets CON2-CON6 are connected to the appliances such as the peripherals of a computer or the individually operating appliances.

Thereafter, if the control part 6 perceives the illuminance change or the body motion or the built-in timer operates to control the appliance in the standby or power saving state, the first to sixth current detecting circuits 5A-5F detect the variation of the current flowing though the appliances, which are led into each lead-in hole CON1-CON6, and input the detection signals to the terminals MAIN, CT2-CT6 of the control part 6. Herein, the operations regarding a current transformer CT11-CT16, a comparator U2, and a transistor Q13-Q18, which are built in the first to sixth current detecting circuits 5A-5F, are omitted since they are apparent to those skilled in the art.

The sixth current detecting circuit 5F has a current adjusting switch 5-1 therein. By means of the current adjusting switch 5-1, the user can adjust the current value depending on the capacity of each appliance so that the outlet strip can be compatible with various appliances with different capacities. For example, with a outlet strip set by a single current capacity, a computer and a battery charger for a mobile phone handset cannot be used without adjusting the capacity since they have different capacities.

Thus, according to the adjustment of the current adjusting switch 5-1, the amplifying rate of the current flowing to each appliance varies. The on/off control signal according to the variation is transferred to the control part 6. The control part 6 can output an appropriate control signal to each appliance even though the appliances have different capacities.

Although it is not shown in the drawings, a current detecting sensor (not shown) detects the current of each appliance, which is being used, before the current adjusting switch 5-1 is operated. Thereafter, the control part 6 may adjust the current adjusting switch 5-1 in compliance with the capacity of each appliance. Herein, the current detecting sensor can be freely installed at the socket of the multi-tap (concent), at the side of each lead-in hole, etc., at the discretion of the manufacturer or by the user's preference.

Although the current adjusting switch 5-1 is connected to only the sixth current detecting circuit 5F according to the drawings, it is only an example. The current adjusting switch can also be connected to one of the first to fifth current detecting circuits 5A-5E.

Next, the output control part 7 is explained.

The output control part 7 is composed of a first to sixth output control part circuits 7A-7F and operates as follows.

The first to sixth output control part circuits 7A-7F receive the on/off control signal according to the control operation of the control part 6 to induce the appliance to a standby or power saving state. The built-in relay elements are connected or disconnected do that the current flowing to each appliance, which is led into each lead-in hole CON1-CON6, can be supplied or intercepted.

Hereinafter, a serial control process of the multifunctional outlet strip for intercepting a stand-by electric power according to the present invention will be explained.

FIG. 9 is a motion flow chart showing a control method of the multifunctional outlet strip for intercepting a stand-by electric power according to the present invention, if an illumination sensor used. FIG. 10 is a motion flow chart showing a control method of the multifunctional outlet strip for intercepting a stand-by electric power according to the present invention, if an illumination sensor and a body-detecting sensor are used at the same time.

The control part 6 receives an on/off signal according to the user's switching of SW6 to determine whether the control is to be made by using only the illumination sensor or both the illumination sensor and the body-detecting sensor at the same time.

With reference to FIG. 9, if only the illumination sensor is used, the control process of the multifunctional outlet strip for intercepting a stand-by electric power according to the present invention is as follows.

First, an illumination sensor 4A of the sensor part 4 detects a change of illuminance [S10]. If the change of illuminance is not detected, i.e., there is no illuminance change, the timer built in the control part 6 operates for a predetermined time period to control an interlocked or single-acted appliance in a standby or power saving state [S11]. At this time, the predetermined time period can be set as the most efficient time for the power saving purpose.

Thereafter, the timer determines that the predetermined time period has passed [S12]. As a result, if a change of illuminance is detected before the predetermined time period has passed, then the control part 6 clears the timer [S13], and puts the main outlet CON1 as a standby state [S14].

If the main outlet CON 1 is not used, only the auxiliary outlets CON2-CON6 are monitored to determine whether they are used under interlocking or single-acting control. However, the control method of the present invention is confined to where the main outlet CON1 is interlocked with at least one auxiliary lead-in hole CON2-CON6.

Thereafter, the control part 6 determines which auxiliary outlets CON2-CON6 are interlocked or single-acted [S15]. The determination is made based on the on/off signal which is transferred to the terminals SW1-SW5 from the motion condition setting part 3 according to the user's switching operation.

If a predetermined number of the auxiliary outlets CON2-CON6 are used with interlocking control, the control part 6 determines whether the main outlet CON 1 is being used at present [S16]. The determination is made based on the on/off signal of the terminal CT1 which depends upon the variation of the current of the current detecting part 5.

If the main outlet CON1 is presently being used, the control part 6 turns on all the predetermined number of the interlocked auxiliary outlets [S17]. To perform this operation, the control part 6 outputs the on/off control signal to the relays of the output control part 7. In other words, since the main outlet CON1, which is in the standby state, is presently being used, the predetermined number (or all) of the auxiliary outlets, which are interlocked with the main outlet CON1, are controlled to be on (standby state).

However, as the result of S16, if the main outlet CON1 is not being used at present, the control part 6 turns off all the predetermined number of the interlocked auxiliary outlets [S18]. Consequently, since the main outlet CON1, which has been under the standby state, is presently not being used, the predetermined number (or all) of the auxiliary outlets, which are interlocked with the main outlet CON1, are controlled to be off (power saving state).

Meanwhile, if a predetermined number of the auxiliary outlets CON2-CON6 are used with single-acting control, the control part 6 turns off all the single-acted auxiliary outlets [S19]. This is independently performed by the control part 6 separately from the standby state of the main outlet CON1.

The following is an explanation regarding the control by the operation of the timer.

If the predetermined time period has passed, the control part 6 determines which auxiliary outlets CON2-CON6 are interlocked or single-acted [520]. If a predetermined number of the auxiliary outlets CON2-CON6 are used with interlocking control, the control part 6 determines whether the main outlet CON1 is being used at present [S21].

As a result of S21, if the main outlet CON1 is presently being used, the control part 6 turns on all the predetermined number of the interlocked auxiliary outlets including the main outlet CON1 [S22].

However, as a result of S21, if the main outlet CON1 is not being used at present, the control part 6 turns off all the predetermined number of the interlocked auxiliary outlets including the main outlet CON1 [S18].

Consequently, through such a process [S20-S23], the main outlet CON1 and the auxiliary outlets interlocked with the main outlet are all controlled to be on (standby state) or off (power saving state).

Meanwhile, as a result of S20, if a predetermined number of auxiliary outlets are only single-acting, i.e., if a predetermined number of auxiliary outlets are individually used while the main outlet CON1 is not being used, the control part 6 determines whether the predetermined number of the auxiliary outlets which are single-acting are presently being used [S24]. This determination is made based on the on/off signal of the terminal ct2-CT6 which depends on the variation of the current of the current detecting part 5.

If the predetermined number of the single-acting auxiliary outlets are presently being used, the control part 6 turns on all the predetermined number of the auxiliary outlets [S25]. To perform this operation, the control part 6 outputs the on/off control signal to the relay of the output control part 7.

However, as a result of S24, if the predetermined number of the single-acting auxiliary outlets are not being used presently, the control part 6 turns off all the predetermined number of the auxiliary outlets [S26].

Consequently, through such a process [S24, S25, S26], the auxiliary outlets which are single-acting are all controlled to be on (standby state) or off (power saving state).

The main outlet CON1 and the auxiliary outlets CON2-CON6, which are controlled in a power saving state or a standby state, repeat the above control process by the control part 6 which controls and determines according to the change of illuminance.

Next, if the illumination sensor and the body-detecting sensor are used at the same time, the control process of the multifunctional outlet strip for intercepting a stand-by electric power according to the present invention is as follows.

First, an illumination sensor 4A of the sensor part 4 detects a change of illuminance or a movement of a human body [S30]. If the change of illuminance or the body movement is not detected, the timer built in the control part 6 operates for a predetermined time period to control an interlocked or single-acted appliance in a standby or power saving state [S31]. At this time, the predetermined time period can be set considering the most efficient mode for the power saving purpose.

Thereafter, the timer determines that the predetermined time period has passed [S32]. If a change of illuminance or a body motion is detected before the predetermined time period has passed, then the control part 6 clears the timer [S33], and puts the main outlet CON1 in a standby state [S34].

The following process S35-S46 for the control is omitted since it is the same as the process in S15-S26.

As described so far, the multifunctional outlet strip for intercepting a stand-by electric power according to the present invention has the illumination sensor or the body-detecting sensor to detect the illuminance change or body movement around each lead-in hole which is under interlocking or single-acting control, has the control part to control each lead-in hole in a standby or power saving state according to the interlocking or single-acting condition by monitoring the detected signal, and is compatible with various appliances with different capacity by adjusting the electric current according to the respective appliances.

While the multifunctional outlet strip for intercepting a stand-by electric power and the control method of the present invention have been described with reference to a preferred embodiment thereof, it will be understood by those skilled in the art that various changes or modifications may be made therein without departing from the spirit and scope of the invention.

For example, for the sensor part 4, a phototransistor, other light sensor, a sound sensor, or a heat sensor can be used in addition to the CDS sensor or the infrared sensor. Also, multiple sensors can be used at the same time.

Also, although only six lead-in holes are shown in the above embodiment, the number of the lead-in holes can be set at the discretion of the manufacturer or the user.

Also, each part of the present invention, i.e., an over-current interceptor, a power part, a motion condition setting part, a current detecting part (current adjusting switch), a control part, and an output control part can be installed within an appliance or a plug as well as the multi-tap (concent).

As explained, the multifunctional outlet strip for intercepting a stand-by electric power performs an interlocking control of the subordinated appliances by means of the illumination sensor or the body-detecting sensor.

Also, the multifunctional outlet strip for intercepting a stand-by electric power according to the present invention has the illumination sensor or the body-detecting sensor, which is compatible with various appliances with different capacities by adjusting the electric current according to the respective appliances.

Also, the multifunctional outlet strip for intercepting a stand-by electric power according to the present invention detects the illuminance change or body movement around each lead-in hole which is under interlocking or single-acting control by the illumination sensor or the body-detecting sensor, and controls each lead-in hole in a standby or power saving state.

What is claimed is:

1. A multifunctional outlet strip for intercepting a stand-by electric power comprising:
    an over-current circuit breaker for detecting and intercepting an over-current or a surge current generated due to malfunction of an appliance;
    a power section for generating and outputting a motion voltage which is supplied to the parts inside of the outlet strip through a rectification, smoothing and voltage regulation process;
    a motion condition setting part in which a user switches and sets which sensor(s) is/are used and whether an interlocking control or a single acting control is adopted;
    a sensor part for detecting a light or a body motion and outputting a signal accordingly;
    a current detecting part for detecting a current flowing into an interacting or a single-acting appliance and outputting a signal that is detected;
    a control part which receives the user's switching signal for the selection of the interlocking/single-acting function and the detected signal and outputs an on/off control signal for controlling an appliance, which is plugged into each outlet in a standby state or a power-saving state according to the interlocking or single-acting condition; and
    an output control part which receives the on/off control signal of the control part and supplies/intercepts the power current flowing into each lead-in holes.

2. The multifunctional outlet strip for intercepting a stand-by electric power according to claim 1, wherein once a reason for the over-current is eliminated by the over-current interceptor, electric power is supplied again by the user's operation of a reset button.

3. The multifunctional outlet strip for intercepting a stand-by electric power according to claim 1, wherein a range of the interceptable over-current varies depending upon the over-current intercepting devices and can be predetermined and set at the initial manufacturing stage.

4. The multifunctional outlet strip for intercepting a stand-by electric power according to claim 1, wherein the power section comprises a step-down transformer for stepping down a commercial alternating current power into a predetermined alternating current voltage, a bridge circuit for full-wave rectifying the transformed alternating current voltage, and a capacitor for smoothing the full-wave rectified alternating current voltage which is to be used as an operating voltage for driving a relay element of the output control part.

5. The multifunctional outlet strip for intercepting a stand-by electric power according to claim 1, wherein operating voltage is a direct current voltage of 12V.

6. The outlet strip of intercepting a stand-by electric power according to claim 1, further comprising a constant voltage circuit for stepping down the operation voltage into a predetermined level of direct current voltage, and outputting it to the control part, the motion condition setting part and the sensor part.

7. The multifunctional outlet strip for intercepting a stand-by electric power according to claim 6, wherein the predetermined level of direct current voltage is 5V.

8. The multifunctional outlet strip for intercepting a stand-by electric power according to claim 1, wherein the power part generates a clock signal for driving a timer built in the control part.

9. The multifunctional outlet strip for intercepting a stand-by electric power according to claim 1, wherein the motion condition setting part consists of an array resistance and a switch, the switch being disposed outside of an outlet so that a user can choose whether an appliance corresponding to each of auxiliary outlets is used in an interlocking condition or a single-acting condition.

10. The multifunctional outlet strip for intercepting a stand-by electric power according to claim 1, wherein the sensor part includes an illumination sensor for detecting a resistance corresponding to illuminance and comparing the resistance with a reference resistance to determine a change of illuminance, and a body-detecting sensor for blocking light according to motion of a human body.

11. The multifunctional outlet strip for intercepting a stand-by electric power according to claim 1, wherein the control part is initially set by receiving an on/off signal corresponding to the use of a sensor and by receiving an on/off signal regarding an option of interlocking or single-acting function, detects a change of illuminance and/or a movement of a human body, detects a variation of a current flowing into each appliance, which is interlocked or single-acted and connected to an auxiliary outlet, and outputs an on/off control signal to the output control part to induce the appliance to a standby state or a power saving state.

12. The multifunctional outlet strip for intercepting a stand-by electric power according to claim 1, wherein if the change of illuminance or the motion of a human body is not detected by the sensor part, a timer built in the control part operates to induce an appliance to a standby or power saving state.

13. The multifunctional outlet strip for intercepting a stand-by electric power according to claim 1, further comprising a current adjusting switch for varying an amplification rate of the current flowing to an appliance, and outputting an on/off control signal to the control part accordingly so that the outlet strip can be compatible with various appliances with different capacities.

14. The multifunctional outlet strip for intercepting a stand-by electric power according to claim 1, comprising one or more current adjusting switches.

15. The multifunctional outlet strip for intercepting a stand-by electric power according to claim 1, wherein the output control part receives an on/off control signal according to a control operation of the control part and connects or disconnects one or more built-in relays so that the current flowing to appliances, which are led into each outlet, can be supplied or intercepted.

16. The multifunctional outlet strip for intercepting a stand-by electric power according to claim 1, wherein the over-current interceptor, the power part, the motion condition setting part, the current detecting part, the control part, and the output control part can be installed within an appliance or a plug.

* * * * *